United States Patent [19]

Weiss et al.

[11] Patent Number: 4,928,802
[45] Date of Patent: May 29, 1990

[54] OVERLOAD RELEASE CLUTCH FOR THE TRANSMISSION OF ROTARY MOVEMENT BETWEEN SHAFTS

[75] Inventors: Hermann Weiss; Rudolf Weiss, both of Vreden, Fed. Rep. of Germany

[73] Assignee: ATEC-Weiss KG, Vreden, Fed. Rep. of Germany

[21] Appl. No.: 359,610

[22] Filed: Jun. 1, 1989

[30] Foreign Application Priority Data

Jun. 8, 1988 [DE] Fed. Rep. of Germany ....... 3819481

[51] Int. Cl.$^5$ ............................................. F16D 23/00
[52] U.S. Cl. ................................. 192/56 R; 192/89 B; 192/67 R; 192/114 R; 464/38
[58] Field of Search ............... 192/56 R, 89 B, 89 QT, 192/67 R, 514 R; 464/38

[56] References Cited

U.S. PATENT DOCUMENTS 2,399,886  5/1946  Odevseff .......................... 192/89 B
4,053,980 10/1977  Poehlmann ....................... 192/89 B
4,220,231  9/1980  Richter et al. ..................... 192/89 B

FOREIGN PATENT DOCUMENTS 2013289  8/1979  United Kingdom ........... 192/89 QT

Primary Examiner—Rodney H. Bonck
Assistant Examiner—Andrea Pitts
Attorney, Agent, or Firm—Sprung, Horn, Kramer & Woods

[57] ABSTRACT

The invention relates to an overload release clutch having: a hub 2 which is disposed on a shaft 1 and has two coupling halves 3,6 which are coupled with provision for axial disengagement in relation to one another by means of a positive connection 4,5 one clutch half 3 being disposed rotatably and axially secured on the hub 2 and the other clutch half 6 being disposed non-rotatably and axially displaceable thereon, the other clutch half 6 being urged towards the first-mentioned clutch half 3 by a spring arrangement having an adjustable axial force and a snap-over characteristic characterized in that the spring arrangement has a concentric resilient ring 8 which is so borne on the hub 2 by means of radially directed rigid bearing elements 10,21 inclined at an angle to the axial normal plane in the direction of the ring 8, that, when acted upon with an axial force directed towards the direction of inclination of the supporting elements 10, the ring 8 can be radially expanded.

8 Claims, 3 Drawing Sheets

OVERLOAD RELEASE CLUTCH FOR THE TRANSMISSION OF ROTARY MOVEMENT BETWEEN SHAFTS

BACKGROUND OF THE INVENTION

1. Field of the Invention

The invention relates to an overload release clutch for the transmission of rotary movements between shafts, having two axially disengageable clutch halves borne by a hub, one coupling half being non-rotatably connected to the hub and the other clutch half being rigidly connected axially to the hub, a spring arrangement being provided which has a snap-over characteristic and which acts with an adjustable axial force on the axially movable clutch half in the engaged state, the spring arrangement consisting of a concentric ring connected to the axially movable clutch half, and radially directed bearing elements which are pivotably disposed at an inclination to the axial plane of the clutch on the ring and the hub disposed at a radial distance inside the ring.

2. Discussion of Prior Art

In a prior art overload release clutch the torque is transmitted from the driven shaft and the hub connected thereto and the other clutch half by means of a positive connection to the other clutch half which is connected to the output. If overloading occurs, the positively interengaging elements of the connection between the clutch halves which, for example, can be constructed in the form of a crown gear connection, produce an axial movement of the other clutch half in relation to the axially fixed clutch half, a relative movement of the clutch halves also taking place in the peripheral direction. The axial movement of the other clutch half is counteracted by the force of a cup spring whose characteristic is so adjusted that the spring can occupy two stable axial positions, the transition from one stable position to the other taking place when the snap-over point on the spring characteristic is exceeded. If, after the snap-over point has been exceeded the spring arrangement occupies its other stable position, the two clutch halves are permanently separated from one another. According to the prior art, in which the spring arrangement is formed by two cup springs, the appropriate axial prestressing force of the spring arrangement is adjusted by means of a release spring which can be adjusted via an axially adjustable sleeve. However, constructionally this prior art spring arrangement is relatively expensive, since to ensure reliable operation, not only the cup springs are required, but various other constructional elements also, for example, a spacer ring between the cup springs or a securing ring.

In one prior art overload release clutch of the kind specified the expense of the construction is substantially lower (German Patent Specification No. 28 21 029 A1, U.S. Pat. No. 4 004 667). In that clutch the bearing elements consist of resilient strips or a pack of lamellar springs clamped between a rigid bearing on the hub and a rigid concentric ring. To change over the clutch, these elements must be deformed by being moved with radial upsetting out of the prestressed position on one side of the neutral plane into a prestressed position on the other side thereof. Such stressing is not optimum for the service life of the resilient strips. Moreover, such constructions are at best suitable for large diameters and the transmission of relatively low torques.

SUMMARY OF THE INVENTION

It is an object of the invention to provide a freely operable safety clutch of the kind specified which is not only very simple in construction, but moreover robust.

To this end according to the invention, in a freely operable safety clutch of the kind specified, the bearing elements are rigid and the ring is so resilient that, when acted upon with an axial force directed towards the direction of inclination of the bearing elements, the ring can be radially expanded.

If the ring is constructed unitarily with the other clutch half, the result is an embodiment of particularly simple construction, thus facilitating more particularly the assembly of the clutch.

Preferably the ring can be radially widened up by the feature that the ring is formed with at least one axial slot starting from its end remote from the connection. The dimensioning of the slot or slots enables the spring characteristic to be adjusted in accordance with the overloading force for which the clutch arrangement is designed.

An embodiment preferable for its reliability is achieved if the ring consists of two component rings which are concentric with one another and can be rotated in relation to one another and each of which is formed with an axial slot, the two slots being offset in relation to one another peripherally. For reasons of symmetry the slots of the two component rings are advantageously disposed diametrically opposite one another. Advantageously, to enhance the reliability of the clutch, the annular space formed between the component rings is filled with a lubricant, more particularly of plastics. This feature reduces the friction between the two component rings if overloading occurs.

Preferably, the pivotable bearing over the bearing elements is formed by an inner ring disposed on the hub. This is where the individual peripherally separately constructed bearing elements are mounted which open the resilient ring if overloading occurs. Such a construction also facilitates clutch assembly.

When the clutch is re-engaged after responding to an overload, a substantially lower force is required, due to the feature that the inner ring has a shoulder which so cooperates with a step on the other clutch half that the maximum permissible disengagement travel of the other clutch half is between the snap-over point and the stable disengaged end position of the other clutch half.

DESCRIPTION OF SEVERAL EMBODIMENTS OF THE INVENTION

DETAILED DESCRIPTION OF THE DRAWINGS

Figure 1:
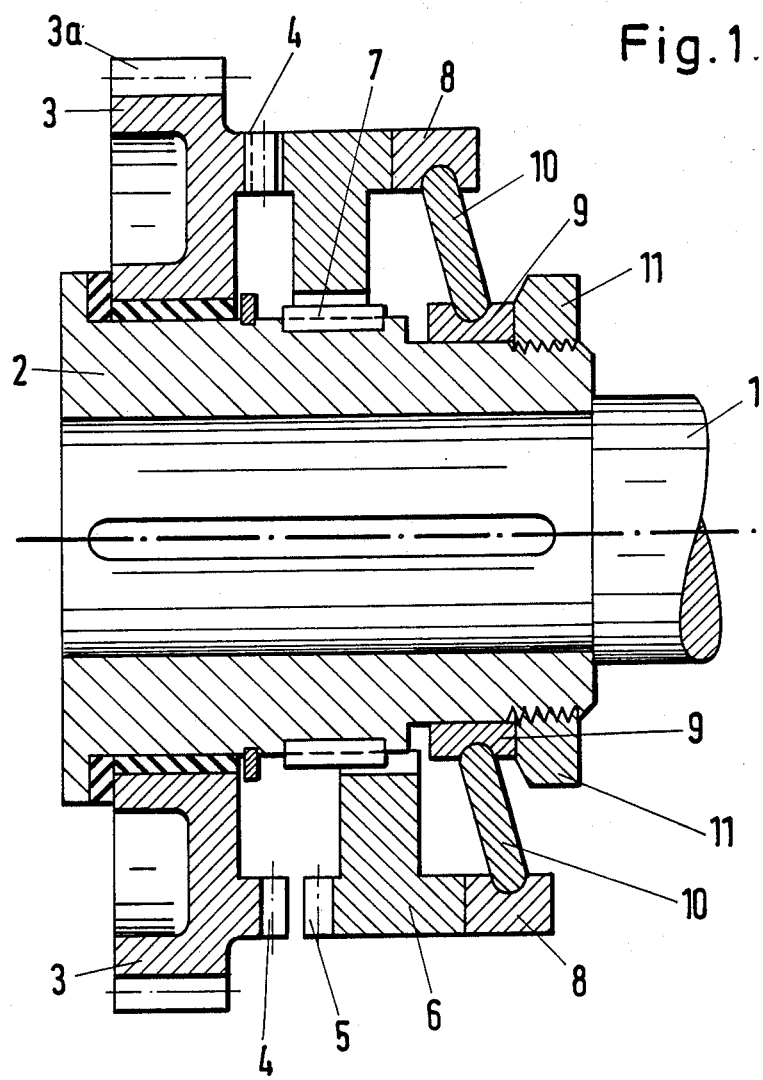
FIG. 1 shows a first embodiment of the clutch according to the invention, shown engaged in the upper and disengaged in the lower half of the drawing.
Figure 2:
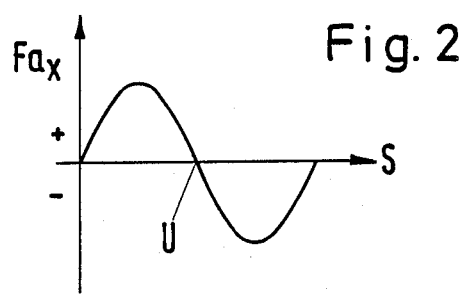
FIG. 2 shows the spring characteristic of the first embodiment illustrated in FIG. 1.

FIG. 1 shows a hub 2 disposed on a driven shaft 1. A first clutch half 3 is disposed rotatably but axially secured on the hub 2. Another clutch half 6 is rigidly connected to the hub 2 via an adjusting spline 7, but the other clutch half can move axially. One clutch half 3 bears on its peripheral side a toothing 3a by means of which the torque to be transmitted is transmitted to an output (not shown). The two clutch halves 3,6 are coupled to one another via crown gears 4,5 interengaging positively at the end face. The gears 4 and 5 are retained fixed as shown in the upper part of FIG. 1 by a spring arrangement comprising a ring, bearing elements 10 and an inner ring 9 and adjusting nut 11. The bearing element 10 is pivotably mounted in a groove in the inner ring 9, which is disposed with provision for axial displacement on the hub. On the other hand the bearing element is also pivotably mounted in another groove in the ring 8. The ring 8 has spring rigidity, so that when acted upon by a radially directed force the ring can be expanded by the bearing element 10. If overloading occurs, the two clutch halves 3,6 move peripherally in relation to one another in such a way that the sections of the gears 4,5 force the other clutch half 6 axially away from the first clutch half 3. The axial movement takes place contrary to the direction of inclination of the bearing elements 10, the ring 8 being opened up as the bearing elements 10 are increasingly erected. As shown by the spring characteristic of the clutch arrangement according to the invention (FIG. 2), with a small axial displacement S at first an increase takes place in the axial counterforce Fa produced by the spring arrangement 8,9,10,11, while when the snap-over point U on the spring characteristic is reached, the spring arrangement snaps over and arrives in the axially disengaged position shown. The axial travel S at which the snap-over occurs is adjusted by the prestressing force of the adjusting nut 11. For example, as a result the overload release clutch can be adapted to different overloading forces. The snap-over point moreover depends on the dimensioning of the radially expandable ring 8.

Figure 3:
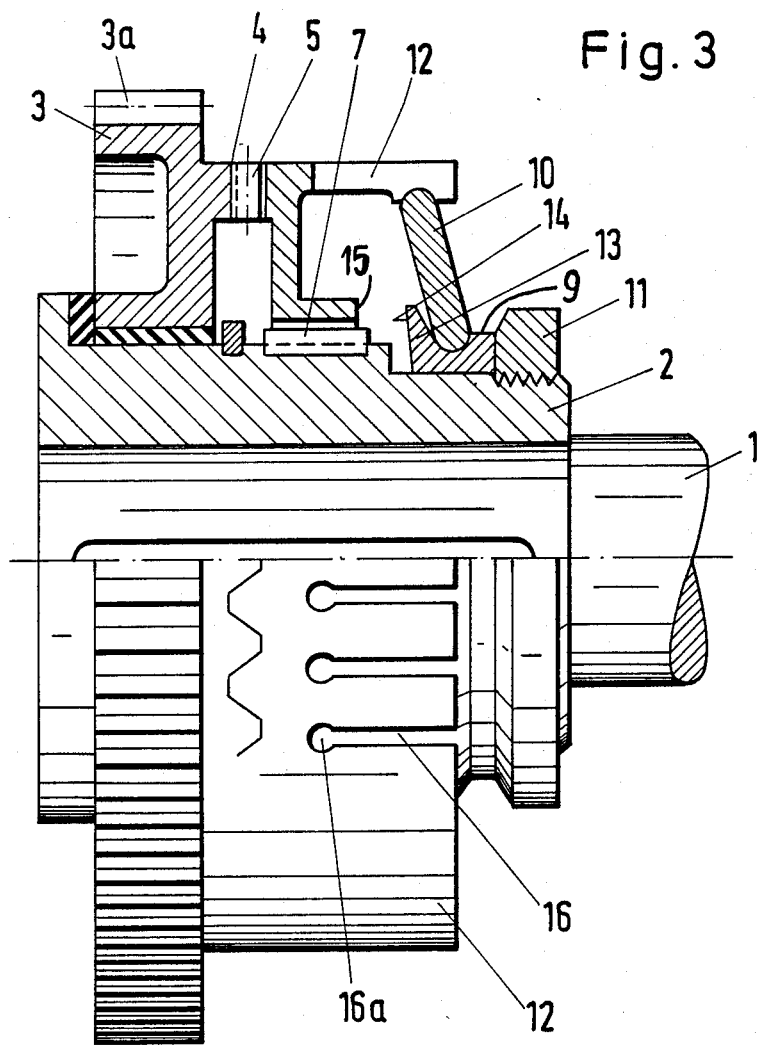
FIG. 3 shows a second embodiment of the invention, the upper part being axially sectioned and the lower part being a peripheral developed view of a part of the clutch.

FIG. 3 shows the second embodiment of the invention. While like members have like references to those in the first embodiment, in this embodiment the other clutch half and the ring of the spring arrangement are constructed as a unitary member 12. The ring 12 is formed with axially extending slots 16 which start from that end of the ring 12 which is remote from the gears 4,5. The slots 16 are uniformly distributed over the periphery of the rings 12 and each terminate in a circular zone 16a.

Figure 4:
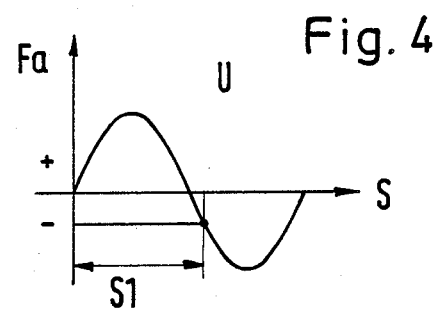
FIG. 4 shows the spring characteristic of the second embodiment shown in FIG. 3.

According to this embodiment the inner ring 11 has a shoulder 14 cooperating with a step 15 of the other clutch half. When during overloading the axially movable half 12 of the clutch is forced away from the clutch half 3, the bearing elements 10 expand the other ring 12, as in the first embodiment. When the bearing elements 10 are substantially vertical—i.e., when the snap-over point U on the spring characteristic has been reached (FIG. 4), a transition takes place to the disengaged axial position of the other cluth half. The axial movement after the "snapping-over" of the clutch half is, however, limited to a travel until the shoulder 14 and the step 15 abut one another. This travel S1 which is also shown in the graph in FIG. 4 lies slightly above the snap-over point Y of the spring characteristic in the embodiment illustrated. This ensures that although the other clutch half is reliably disengaged, it can be re-engaged with a comparatively low spring force.

Figure 5:
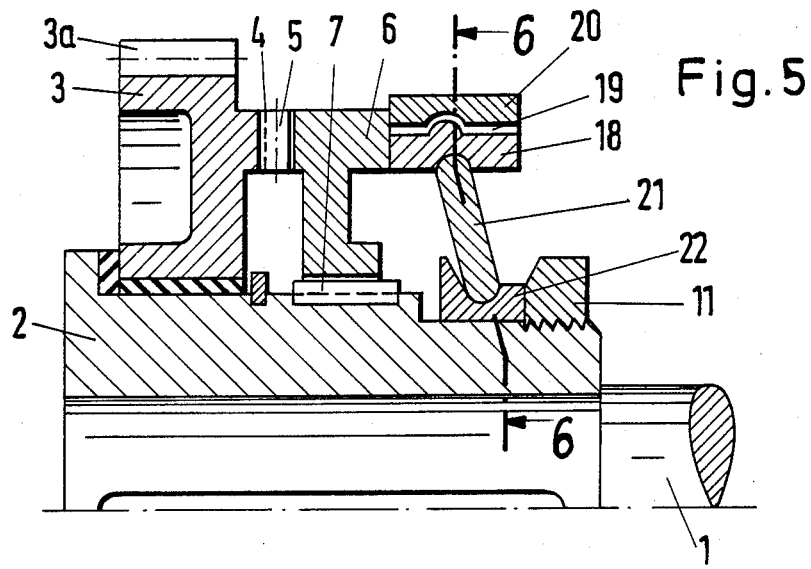
FIG. 5 is a partial cross-section of a third embodiment.
Figure 6:
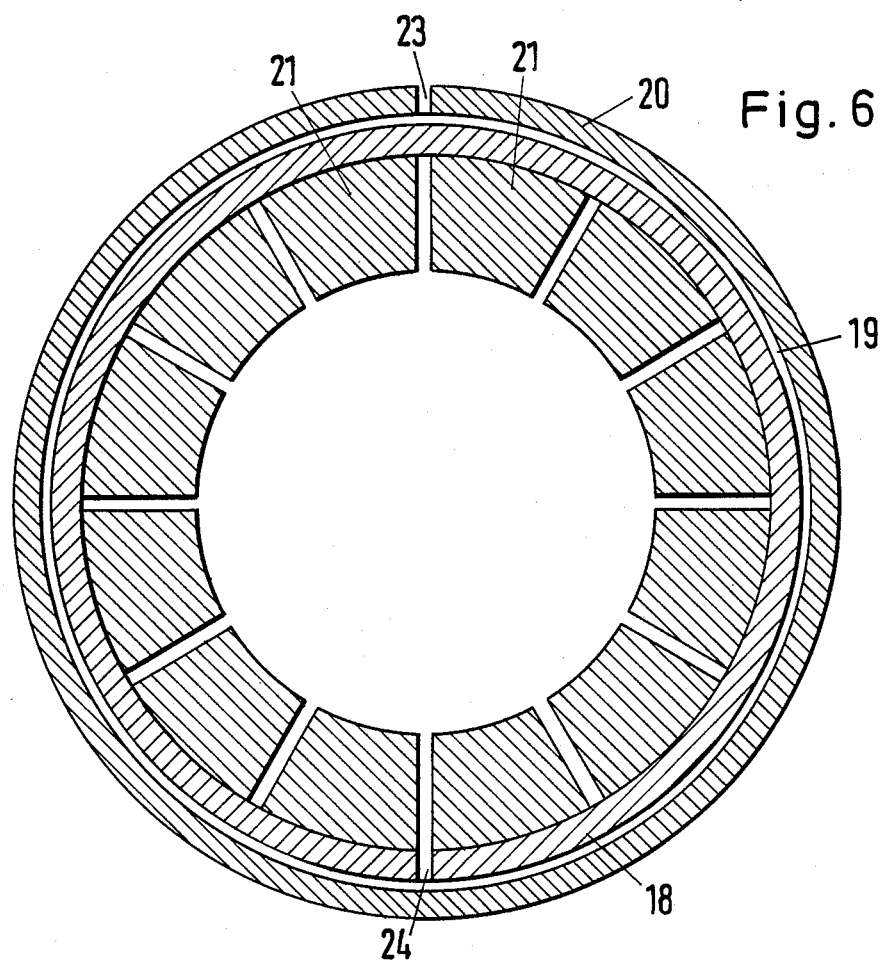
FIG. 6 shows the third embodiment, sectioned along the line AA in FIG. 5.

The third embodiment shown in FIG. 5 differs from the second embodiment by the feature that the ring is constructed in the form of two component rings 18,20 which are concentric with one another and can rotate in relation to one another. Each of the component rings is formed with a slot 23,24, the slots 23,24 being preferably offset in relation to one another by 180. A lubricant 19 in the form of a plastics is disposed in the annular space formed between the component rings 20,18. The bearing elements 21 are substantially constructed like the bearing elements 10 in the first and second embodiments. If overloading occurs, the two component rings 18,20 can expand separately from one another, the plastics substance provided reducing friction between the associated surface of the component rings 18,20.

What is claimed is:

1. An overload release clutch for the transmission of rotary movements between shafts, having two axially disengageable clutch halves borne by a hub and the other clutch half being rigidly connected axially to the hub, a spring arrangement being provided which has a snap-over characteristic and which acts with an adjustable axial force on the axially movable clutch half in the engaged state, the spring arrangement consisting of a concentric ring connected to the axially movable clutch half, and radially directed bearing elements which are pivotably disposed at an inclination to the axial plane of the clutch on the ring and the hub disposed at a radial distance inside the ring, wherein the bearing elements are rigid and the ring is so resilient that, when acted upon with an axial force directed towards the direction of inclination of the bearing elements, the ring can be radially expanded.

2. A clutch according to claim 1, wherein the ring is unitary with the other clutch half.

3. A clutch according to claim 1, wherein the ring is formed with at least one axial slot starting from its end remote from the connection.

4. A clutch according to claim 1, wherein the ring consists of two component rings which are concentric with one another and can be rotated in relation to one another and each of which is formed with an axial slot, the two slots being offset in relation to one another peripherally.

5. A clutch according to claim 4, wherein the slots of the two component rings are disposed diametrically opposite one another.

6. A clutch according to claim 5, wherein the annular space formed between the component rings is filled with a lubricant, more particularly of plastics.

7. A clutch according to claim 1, wherein a pivotable bearing of the bearing elements is formed by an inner ring disposed on the hub.

8. A clutch according to claim 7, wherein the inner ring has a shoulder which so cooperates with a step on the other clutch half that the maximum, permissible disengagement travel of the other clutch half lies between the snap-over point and the stable disengaged end position of the other clutch half.

* * * * *